United States Patent

[11] 3,601,706

| [72] | Inventors | Frederick H. Battle, Jr.;<br>Edward Savage, both of Dix Hills, N.Y. |
|------|-----------|-----|
| [21] | Appl. No. | 15,394 |
| [22] | Filed | Mar. 2, 1970 |
| [45] | Patented | Aug. 24, 1971 |
| [73] | Assignee | Cutler-Hammer, Inc.<br>Milwaukee, Wis. |

[54] PULSE INTERVAL DECODER
6 Claims, 1 Drawing Fig.

[52] U.S. Cl.............................................. 328/119,
307/234, 328/112, 328/161, 340/147 R, 343/106
[51] Int. Cl....................................................H03k 13/00,
G01s 1/44
[50] Field of Search........................................... 307/234;
328/111, 112, 119, 161; 343/106 R, 5 DP, 6.5 LC,
6.8 LC; 340/147 R, 167 R, 167 A, 168 B

[56] References Cited
UNITED STATES PATENTS

| 3,160,886 | 12/1964 | Battle, Jr. ..................... | 343/106 |
| 3,189,902 | 6/1965 | Kintner ........................ | 343/106 X |
| 3,191,175 | 6/1965 | Battle, Jr. et al............. | 343/106 |
| 3,195,132 | 7/1965 | Battle, Jr. et al............. | 343/106 |

Primary Examiner—Stanley D. Miller, Jr.
Attorney—Henry Huff

ABSTRACT: A system for determining the average length of intervals between pulses in a finite train, including a pulse counter, two alternately operating interval timing devices, an arithmetic divider, and storage and logic circuits. An interval-adaptive track gate arrangement provides discrimination against spurious pulse intervals.

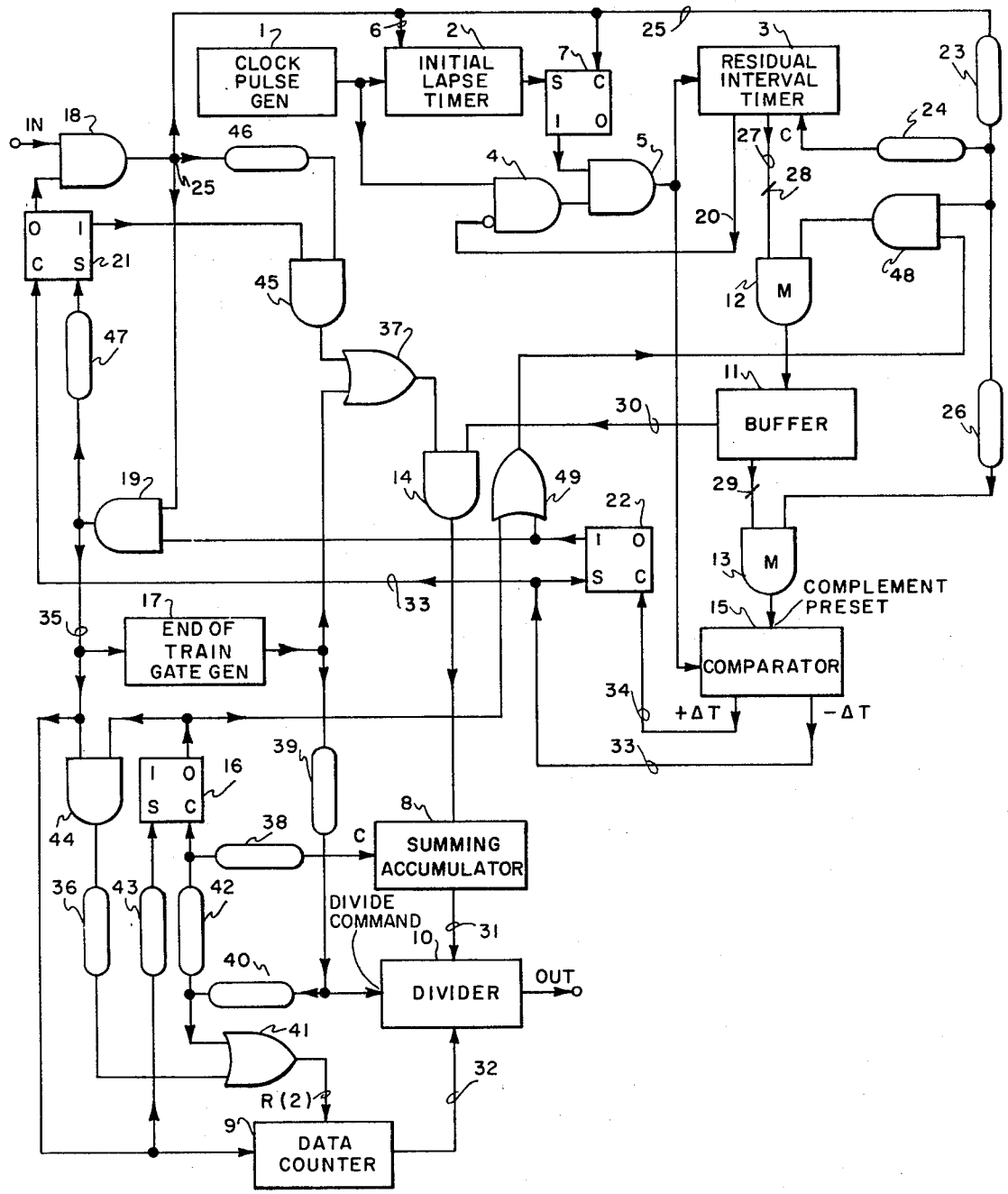

3,601,706

PULSE INTERVAL DECODER

BACKGROUND

1. Field

This invention pertains to the art of decoding or translating signals which are received as trains of pulses with repetition periods that represent variable quantitative data, and producing an output following the end of each train that represents the average value of the data represented by the pulse repetition periods of that train.

2. Prior Art

There are many existing signalling systems wherein pulse trains are used, with repetition periods varying to represent varying values of quantitative data to be communicated. In certain applications, as in aircraft instrument landing systems of the type using angle coded scanning beams, the received pulse trains are relatively short compared to the intervals between trains, and it is desirable to obtain and display, or otherwise utilize, the average value of the data represented by each train. U.S. Pat. 3,191,175 illustrates such a landing system, including a form of pulse interval decoder. Another pulse interval decoder for this purpose is shown in U.S. Pat. 3,160,866. These patents represent the most pertinent prior art presently known to applicants.

The decoders described in the above mentioned patents are error feedback devices, analogous to closed loop servosystems, wherein a stored data signal is updated by error signals representing the difference between the stored value and the then-existing value.

Such devices produce an output that approaches a precise representation of the data value by reducing the error in successive small corrections, one after each pulse repetition interval or pulse train and therefore may tend to be undesirably sluggish or unstable in operation under certain conditions. The physical implementation of a system having desired speed, precision ans stability characteristics tends to be complex and expensive.

SUMMARY

According to this invention, each data-representative pulse interval is precisely measured individually as it occurs, without the use of error feedback corrections produced from previous stored measurements. The interval measurements are accumulated during the pulse train, and counted. Following the end of each train, the total of the accumulated measurements is arithmetically divided by the number of intervals measured to determine the average.

The use of two alternately operating interval timing devices allows reset and data transfer functions associated with one to occur while the other is operating, permitting measurement of contiguous intervals. A presently preferred embodiment of the invention comprises a combination of known types of binary digital devices such as registers, counters, logic gates and flip-flops, with the consequent advantages of stability, wide dynamic range, and precise high-speed operation. Means are provided to reject erroneous interval measurements caused by noise or missed pulses without serious degradation of the data average determination.

DRAWING

The single FIGURE of the drawing is a schematic block diagram of a pulse interval decoder system constituting a preferred embodiment of the invention.

DESCRIPTION

Referring to the drawing, the system includes the following major subcombinations which can be designated generally in terms of their respective functions:

a. interval measuring means, comprising a clock pulse generator 1, an initial lapse timer 2, a residual interval timer 3, clock pulse gates 4 and 5, and clock gate control flip-flop 7, b. a summing accumulator 8, c. a data pulse counter 9, d. an arithmetic divider 10, e. interval measurement transfer means including a buffer 11 and gates 12, 13 and 14, f. track gate control means including a track interval comparator 15 and a track gate flip-flop 22, g. an end of train gate signal generator 17, and h. input gate means consisting of an input gate 18, a track gate 19, and associated control elements including a track validation flip-flop 21.

Other ancillary elements of the system will be identified as the description proceeds.

In the interval measurement part of the system, the clock pulse generator 1 is coupled to the initial timer 2 and to the residual interval timer 3 by way of AND gates 4 and 5. Gate 4 is arranged to inhibit the flow of clock pulses to gate 5 under certain conditions, as will appear. The flip-flop 7 is connected to gate 5 in such manner that when it is in its set condition gate 5 is enabled and when it is in its clear condition, gate 5 is disabled. The initial lapse timer 2 is in effect simply a delay device, arranged to start in response to a pulse applied to its input lead 6, and produce an output signal pulse after a precise interval equal to or somewhat shorter than the shortest expected minor interval between data pulses. The term "minor interval" as used herein is intended to mean the interval between a data pulse and the next succeeding data pulse, and is intended to exclude the generally longer intervals between the last pulse of one group and the first pulse of a subsequent group, whether such groups are separate pulse trains, or parts of an interrupted single train.

By way of example, the timer 2 may be a binary shift register arranged to transfer the binary status, 0 or 1, of each stage to the next succeeding stage in response to each clock pulse from the clock generator 1. Initially, all stages are in the 0 state. A pulse on input lead 6 sets the first stage to the 1 state. After a precise number of clock pulses, determined by the number of stages, the final stage is driven to the 1 state and produces an output pulse. Subsequent clock pulses simply shift the 0 state along the register, producing no output until after another start pulse is applied to input lead 6.

The residual interval timer 3 is, in this example, a binary counter capable of counting up to a predetermined number of clock pulses representing a maximum interval which, added to the initial interval, yields a total interval somewhat longer than the longest expected minor interval between data pulses. The timer 3 includes count sensing means arranged in known manner to produce an output signal on lead 20 whenever the maximum interval count is attained. The lead 20 is connected to the inhibit control terminal of the clock gate 4.

The timer 3 has a clear input terminal, indicated by the letter C. This clear terminal is connected through delays 23 and 24 to the gated input pulse line 25, which is also connected to the clear input terminal of the clock gate control flip-flop 7. The timer 3 is provided with parallel output means by way of line 27 to gate 12. Line 27 is a multiple line, as indicated conventionally by the short transverse line 28, and gate 12 is a multiple AND gate, as indicated by the enclosed symbol M. The enable input terminal of gate 12 is connected to be energized from the input line 25 by way of delay 23 and an AND gate 48 which may, under some operating conditions, be disabled to prevent enablement of the gate 12.

The buffer 11 is a binary register adapted to be set, when the gate 12 is enabled, to the value then standing in the timer 3, and to remain in that condition until set in similar manner to some new value standing in the timer 3 at that time. The buffer has parallel output means including a multiple line 29 and multiple AND gate 13, connected to be enabled from input line 25 through delays 23 and 26. The buffer provides another output to the sum accumulator 8 by way of a line 30 and gate 14. Line 30 and gate 14 may be multiples, like line 29 and gate 30, or may be single channel devices for serial readout from the buffer to the accumulator when gate 14 is enabled. In either case the readout is nondestructive, i.e. the value in the buffer is sensed and added to the contents of the accumulator without affecting the contents of the buffer.

The summing accumulator 8 may be a binary register device provided with known means for augmenting its contents by the amount then stored in the buffer 11 each time the gate 14 is enabled. The accumulator also has a clear input terminal, indicated by the letter C, which, when energized, clears the accumulator to zero. The accumulator output on line 31 represents the total quantity stored in the accumulator, and is applied as the dividend input to the divider 10.

The data counter 9 is a binary counter arranged, as will be described, to be actuated by input pulses that have been accepted by the system as valid data pulses. The counter output on line 32 is applied as the divisor input to the divider 10. The counter 9 is adapted in known manner to be reset to two, i.e. binary 10, upon energization of a reset input terminal denoted by the legend R(2). The divider 10 is any suitable known type of arithmetic divider device, adapted to receive the dividend and divisor inputs on lines 31 and 32 and produce, in response to a divide command signal, an output representing the quotient.

The comparator 15 is a binary counter similar to the residual interval timer 3, but including count sensing means arranged in known manner to produce an output on line 33 whenever the count reaches a value such that a small predetermined number of additional clock pulses would drive the counter to full count, thence to zero. This number of clock pulses represents a short time interval $\Delta T$. The lend $-\Delta T$ adjacent line 33 means that the output signal appears there by the amount $\Delta T$ prior to the time the count would reach zero if continued.

Similar count sensing means are arranged to provide an output on line 34 when the count reaches a value above zero corresponding to an interval $+\Delta T$. Thus, when the counter operates to count up to and beyond its zero state, a signal will appear on line 33 as zero is approached, and then a signal will appear on line 34 after a total interval $2\Delta T$. The numbers to be sensed for this purpose are chosen to make $2\Delta T$ substantially longer than the maximum expected difference between successive minor intervals of the data pulse train. The output terminals of multiple gate 13 are coupled to respective counter stages in the comparator 15 in such sense that when the gate 13 is enabled, the comparator counter is preset to the binary complement of the quantity then standing in the buffer.

The outputs of the comparator 15 on lines 33 and 34 are denoted respectively as the track gate trigger signal and the track fail signal, and are applied to the set and clear input terminals, respectively, of the track gate flip flop 22. The track gate trigger signal on line 33 is also applied to the clear output terminal of flip-flop 22 is connected to enable the track gate 19, and also is applied as an input to an OR gate 49, which is connected to enable gate 48. The clear output of flip-flop 21 is connected to enable the input gate 18. The set output of flip-flop 21 enables an AND gate 45, which receives an input from line 25 through a delay 46. The output of gate 45 goes through an OR gate 37 to the enable input terminal of the transfer gate 14 between the buffer and the accumulator. The line 25 is also connected as an input to track gate 19.

The output of track gate 19 is applied by way of tracked pulse line 35 to the data counter 9, gate 44, and through a delay 47 to the set input of flip-flop 21. Line 35 is also connected to the input of the end of train gate generator 17, which is a timing device that produces an output signal following an input pulse after a predetermined time interval several times as long as the longest expected minor interval between data pulses. The generator 17 may be a monostable multivibrator device, a counter, or a shift register similar to the initial lapse timer; in any case it is arranged to restart its timing from the beginning in response to each input pulse, whether or not the interval has expired and produced an output.

The output of the end of train gate generator 17 is applied to the OR gate 37, and through delay 39 to the command input of the divider 10, thence through delay 40 to OR gate 41, through delay 42 to the clear input terminal of a track status flip flop 16, and finally through a delay 38 to the clear input of accumulator 8. The set input of the flip-flop 16 is connected to the tracked pulse line 35 through a delay 43. The clear output terminal of flip-flop 16 is connected to enable gate 44, which supplies an input to the OR gate 41 through a delay 36. The output of OR gate 41 goes to the reset input R(2) of the data counter 9. The clear output of track status flip-flop 16 is also applied as a second input to OR gate 49.

In the operation of the system, the following conditions exist initially. Track validation flip-flop 21, track gate flip-flop 22 and track status flip-flop 16 are cleared, respectively enabling input gate 18 and disabling gate 45; disabling track gate 19; and enabling data counter reset gate 44. The left-hand input terminal of gate 49 is energized, and gate 48 is enabled. Clock gate control flip-flop 7 is set, enabling clock gate 5.

The residual interval timer 3 stands at maximum interval, as will be explained later, and clock gate 4 is inhibited. The track gate comparator 15 stands at some arbitrary quantity and the buffer 11 remains set at the last value previously transferred into it from the residual interval timer. Accumulator 8 is cleared, and data counter 9 is set to two.

The foregoing initial conditions result, as will be seen, from the normal cycle of operations at the end of the immediately preceding pulse train. If some should not prevail, as for example when the system is activated after a period of idleness, the first pulse train may cause a false start which will terminate automatically with all components in correct initial status.

In a typical application, as in use with the airborne receiver of an aircraft landing system of the type described in U.S. Pat. 3,191,175, the interval between two successive received pulses represents the current value of the data, in this case the angular position of the axis of a scanning beam, for example as follows:

$$t_n = 60 + 2\Phi,$$

where $T_n$ is the interval in microseconds between the $(n-1)$ th pulse and the $n$th pulse, and $\Phi$ is the beam angle in degrees with respect to some reference, such as the horizontal, at the time of the $n$th pulse.

The data pulses of interest are produced by the aircraft receiver only during the relatively small percentage of the time that the craft is within the scanning beam that sweeps by it. For example, the total duration of each pulse train may be about 0.004 second, and the interval between that the next similar train about 0.2 second. The total number of pulses in a train will vary with the position of the aircraft, for example its elevation angle, from say about 60 when the angle is near zero to about 40 when the angle is 20°. The interval between successive pulses changes somewhat during the Progress of the train, because the beam angle $\Phi$ changes. The average pulse interval is taken to represent the actual angle of direction of the aircraft from the ground transmitter.

The airborne receiver is provided with known means, which form no part of this invention, for processing the received signals for identification and noise rejection and to produce data trains of the described type. Notwithstanding these operations, the receiver output will ordinarily include spurious pulses that resemble the desired pulses but represent no useful information. The spurious pulses occur at random, both between and intermingled with the data trains. No single pulse, considered alone, is positively identifiable as a true data pulse or a spurious pulse.

The first pulse, either meaningful or spurious, that occurs after the previously described initial conditions have been established, is passed by gate 18 to the gated pulse line 25. This pulse immediately starts the initial lapse timer 2, and simultaneously clears flip-flop 7, disabling clock gate 5. After a delay introduced by the delay device 23, gate 12 is enabled through gate 48 to transfer the maximum interval count then standing in the residual interval timer 3 into the buffer 11. Shortly later, after delay 24, the pulse clears the timer 3, and after delay 26, enables gate 13 to preset the comparator 15 to the complement of the quantity then standing in the buffer 11, that is, the maximum interval count that was initially in the timer 3. For the purpose of this explanation, it may be assumed that the comparator is preset to some value differing from zero by more than $\pm\Delta T$.

When the residual interval timer 3 is cleared, the maximum interval line 20 is deenergized and clock gate 4 is enabled. Clock gate 5 remains disabled until the end of the interval determined by the initial lapse timer 2. At the end of the initial interval, which may equal the shortest expected data pulse interval, 60 microseconds in the present example, corresponding to a data value $\Phi=0$, the timer 2 produces an output pulse which sets flip flop 7 and enables the gate 5. Clock pulses then go to the residual interval timer 3 and to the comparator 15, where they are simultaneously counted, starting from zero in the residual interval timer 3 and starting from the preset value in the comparator 15.

If no other input pulse appears at gate 18 before the residual interval timer counts up to its maximum interval state, line 20 is energized, inhibiting gate 4 and stopping the count at that state in the time 3 and at some new arbitrary value in the comparator 15. The previously described initial conditions exist, except for the new value standing in the comparator. The next subsequent input pulse, following the maximum interval operation of timer 3, will be treated as the first pulse, reinitiating the operation.

When a second input pulse appears before the residual interval timer 3 has counted up to maximum interval state, it immediately starts the initial timer 2 and clears flip flop 7, disabling gate 5 to stop timer 3 and comparator 15. The count standing in residual timer 3 at this instant represents the interval between the first and second pulses, less the fixed initial interval determined by timer 2. This quantity is transferred to the buffer 11, its complement is preset into comparator 15, and timer 3 is cleared. Meanwhile the initial timer 2 has been running and continues until the end of the fixed initial interval after the second input pulse, when it produces an output pulse, enabling gate 5 and starting the residual timer 3 and comparator 15.

The residual timer 3 now counts up from zero, and the comparator 15 counts up from the quantity which was last preset into it, representing the complement of the previously measured residual interval between between the first and second input pulses. When and if the residual interval currently being timed approaches that previously measured and presently standing in the buffer 11, the count in the comparator 15 will similarly approach full count, then zero. As the comparator count arrives at a value representing a time $\Delta T$ before the zero count, the track gate trigger line 34 is momentarily energized, setting track gate flip flop 22 to enable track gate 19 and energize the right hand input terminal of OR gate 49 and, at this time redundantly, applying a clear input to track validation flip flop 21.

If now a third input pulse occurs while the track gate 19 is enabled, it restarts the initial timer 2 and stops the residual timer 3 and comparator 15 as previously described, and also it passes through the track gate 19 to the tracked pulse line 35. The tracked pulse on line 35 starts the end of train gate generator 17, and initiates the following operations which are completed during the time the third pulse is delayed in device 23, and before transfer gate 12 is enabled.

The validation flip flop 21 is set, disabling the input gate 18 and enabling gate 45. No further input pulses will be accepted until the next following track gate trigger signal clears the flip flop 21. The third input pulse, after a delay in device 46 slightly longer than delay 47, passes through gates 45 and 37 to enable gate 14, which transfers the quantity then standing in buffer 11 into accumulator 8. This quantity represents the residual portion of the interval $T_1$ between the first two pulses, which have been accepted as valid because the third pulse followed the second after an interval $T_2$ that differed from the interval $T_1$ by less than $\Delta T$.

The tracked third pulse also enters the data counter 9, momentarily increasing its count to three, and goes through gate 44, delay 36 and OR gate 41, immediately resetting the counter 9 to two. After delay 43, which is longer than delay 36, the same pulse sets flip-flop 16, disabling gate 44 and deenergizing the left hand input terminal of gate OR 49. The right hand input terminal is energized at this time, because flip flop 22 is in its set condition, and gate 48 is enabled.

Following the above described operations that were initiated by the tracked third pulse on line 35, the delayed third pulse passes through gate 48 and enables the transfer gate 12, then clears the residual timer 3 and enables transfer gate 13, all as previously described. The quantity transferred into the buffer 11 at this time, and present in complement form into comparator 15, represents the residual interval portion of the interval $T_2$ between the second and third input pulses. At the end of the fixed initial interval after the third pulse, the residual timer 3 and comparator 15 are started again, producing another track gate trigger signal at a time $\Delta T$ before the end of an interval after the third input pulse equal in length to the preceding interval $T_2$.

The track gate trigger clears flip flop 21, enabling input gate 18 and, redundantly at this time, applies a set input to track gate flip flop 22. If a fourth input pulse occurs while the track gate 19 is still enabled, that is before the comparator 15 has counted past zero to a state corresponding to $+\Delta T$, the above described cycle of operations that followed the third pulse is repeated, except that the quantity transferred from the buffer into the accumulator at this time represents the residual portion of the interval $T_2$, and the data counter 9, which was advanced to the count of three by the gated fourth pulse, is not reset back to two because the track status flip flop 16 has remained set and gate 44 has remained disabled.

Each subsequent input pulse that occurs within the $\pm\Delta T$ track gate period established by the interval between the two immediately preceding pulses will be admitted by the input gate 18, passed through track gate 19, advance the data counter 9 by one count, add the quantity last stored in the buffer 11 to the contents of the accumulator 8, and finally transfer the latest residual interval measurement from the timer 3 to the buffer. Thus, after the $n$th such pulse, the counter 9 will stand at $n=(n-1)$, where $N$ is the total number of interpulse intervals that have been measured. A quantity representing the sum $\Sigma T$ of the first $N-1$ said intervals is stored in the accumulator and a quantity representing the $N$th interval remains in the buffer.

Assuming the $n$th pulse to be the last one of a train, the clock gates 4 and 5 will remain enabled, and comparator 15 will continue to run past zero to $+\Delta T$, then produce a track fail signal on line 34 and clear the track gate flip flop 22, disabling the track gate 19. The residual timer 3 will continue to run until it reaches maximum interval status, when it inhibits clock gate 4 and stops itself and comparator 15.

The end of train gate generator 17, which was last started by the tracked $n$th pulse, finally runs out and produces an output signal representing a declaration that the $n$th pulse was in fact the last of its train. This signal goes through OR gate 37, enabling gate 14 and transferring the representation of the final, $N$th, interval from the buffer to the accumulator. The accumulator now contains a quantity representing the sum of all $N$ measured intervals.

Following the delay 39, which is long enough to allow completion of the transfer from buffer 11 to accumulator 8, the end of train signal provides a divide command signal to the divider 10, which then produces an output representing the quotient of the sum of the $N$ intervals divided by the number $N$ of said intervals. The quotient signal represents the average of the length of the measured intervals.

After further delay in 40, which is sufficiently long to allow completion of the operation of divider 10, the end of train signal passes through OR gate 41 and resets the data counter 9 to two. Then, following a further delay in 42, it clears flip flop 16, enabling gate 44. Finally, after a still further delay in 38, it clears the accumulator 8. All parts of the system now stand in their previously described initial conditions, in readiness for the next train of input pulses.

There is a finite possibility that an occasional valid data pulse may be missed, owing for example to a momentary failure in the transmitter system. If any of the first three pulses is missed, the start of the tracking operation is merely deferred. If the last pulse is missed, the next previous one that was not missed will be regarded as having been the last.

When a pulse is missed after tracking has started, the system begins the sequence that normally follows the last pulse of a train; the track gate is disabled, the clock gate 4 is inhibited, and the end of train gate generator 17 continues to run from a starting time set by the last tracked pulse. At this time the track status flip flop 16 is still set; accordingly, both inputs of OR gate 49 are deenergized and gate 48 is disabled. If another pulse, either valid or spurious, occurs before the end of train period runs out, it finds the timers 2 and 3 in their original initial states, ready to begin measuring the interval between that pulse and the next subsequent one. However, the maximum interval standing in residual timer 3 is not transferred to the buffer 11, because gate 48 is disabled and the transfer gate 12 cannot be enabled. The buffer retains the representation of the interval immediately preceding the last tracked pulse. The corresponding complement is again preset into comparator 15, and if the next following pulse occurs after an acceptable interval, tracking will resume.

The accumulator still retains the sum of the previously measured intervals that have been transferred to it, and the data counter holds its count from the last tracked pulse. Thus, if tracking is reestablished before the end of train gate signal occurs, the subsequently measured intervals and data counts are simply added to those which were retained, and the system operates as before, finally producing an output that represents the average value of all of the data intervals except those adjacent to the missed pulse. If desired, the system may be designed to accommodate two or more missed pulses in succession, by appropriate increase in the length of the interval determined by the end of train gate generator. Such accommodation of missed pulses results in less error in the derived average interval compared with the intended average interval than if tracking were terminated in midtrain when pulses are missed.

What we claim is:

1. In a system wherein the lengths of the minor intervals between pulses in each finite train of pulses in a series of such trains represent respective values of quantitative data, apparatus for determining the average value of the data represented by each such train, comprising:
   a. interval measuring means for producing a representation of a data-significant component of each of said minor intervals in succession,
   b. an accumulator adapted to receive said successively produced data-significant representations and produce an output representing the sum of said measured interval components of the current train;
   c. A data counter responsive to said pulses for producing an output representing total number of measured interval components of the current train, and
   d. an arithmetic divider device responsive to the outputs of said accumulator and said counter to produce a quotient output.

2. The invention set forth in claim 1, wherein said interval measuring means includes two timers, and means responsive to said pulses to stop one of said timers and coincidentally start the other, whereby said timers operate in uninterrupted alternation during said measurements of said minor intervals.

3. The invention set forth in claim 2, wherein one of said timers is adapted to measure a predetermined interval of length no longer than the shortest expected minor interval between pulses and produce an output signal at the end of such predetermined interval, and the other timer is adapted to measure the remaining portion of a minor interval between pulses, further including means responsive to said output signal produced by said first mentioned timer to start said other timer.

4. The invention set forth in claim 1, further including
   a. buffer means,
   b. first transfer gate means responsive to each pulse defining the end of a minor interval to transfer a representation of the most recently measured interval component from said interval measuring means to said buffer
   c. second transfer gate means for adding the contents of said buffer means to the contents of said accumulator,
   d. timing means for producing a control signal in response to the passage of an interval substantially longer than the longest expected minor interval following the most recent pulse, and
   e. means responsive to said control signal or to the next subsequent pulse, whichever occurs first, to enable said second transfer gate means.

5. The invention set forth in claim 4, further including
   a. comparator means including means for producing a representation of the interval component currently being measured and responsive to said last mentioned representation and to said representation stored in said buffer to produce a track gate trigger signal upon the approach to approximate equivalence between said representations,
   b. means responsive to said track gate trigger signal to initiate a track gate signal, and
   c. means including a track gate responsive to said track gate signal to prevent application of a pulse to said first transfer gate means except upon the concurrent presence of an input pulse and said track gate signal.

6. The invention set forth in claim 4, wherein said comparator is responsive to said interval component representations to produce a track failure signal in the absence of output from said track gate means within a predetermined time following initiation of said track gate signal, further including
   a. means responsive to said track failure signal to terminate said track gate signal,
   b. track status storage means responsive to the first pulse in a respective train that appears as output from said track gate means to assume a track status condition that is sustained at least as long as the current pulse train continues, and
   c. means responsive to the presence of a track status condition in the absence of a track gate signal to prevent operation of said first transfer gate means.

UNITED STATES PATENT OFFICE
CERTIFICATE OF CORRECTION

Patent No. 3,601,706　　　　　　　　　Dated August 24, 1971

Inventor(s) Frederick H. Battle, Jr. and Edward Savage

It is certified that error appears in the above-identified patent and that said Letters Patent are hereby corrected as shown below:

Column 3, line 26, "lend" should be --legend--; line 47, "output" should be --input--; line 48, after "of", insert --the track validation flip flop 21. The set output terminal of --. Column 4, line 32, tn=60 + 2∅ should read Tn=60+2∅; line 41, after "that", insert --and--; line 47, "Progress" should be --progress--. Column 5, line 16, "time" should be --timer--. Column 6, line 6, "present" should be --preset--; line 34, "n = (n-1)" should read -- N=(n-1)--. Column 7, line 50, after "representing" insert --the--.

Signed and sealed this 14th day of March 1972.

(SEAL)
Attest:

EDWARD M. FLETCHER, JR.　　　　　　ROBERT GOTTSCHALK
Attesting Officer　　　　　　　　　　Commissioner of Patents